No. 764,973. PATENTED JULY 12, 1904.
O. P. ANKENY.
DEVICE FOR SEPARATING SLIMES IN ORE REDUCTION.
APPLICATION FILED MAR. 14, 1904.
NO MODEL. 2 SHEETS—SHEET 1.
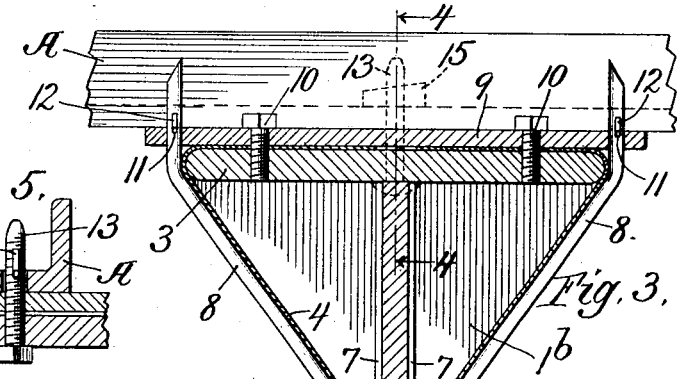
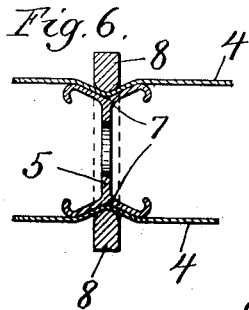
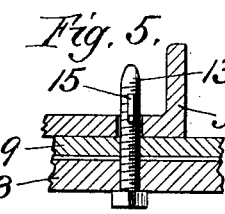
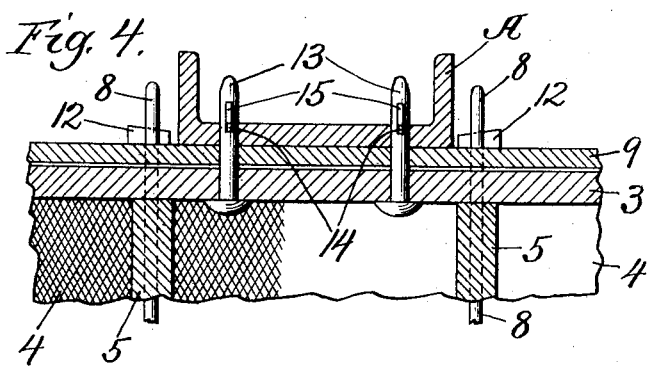
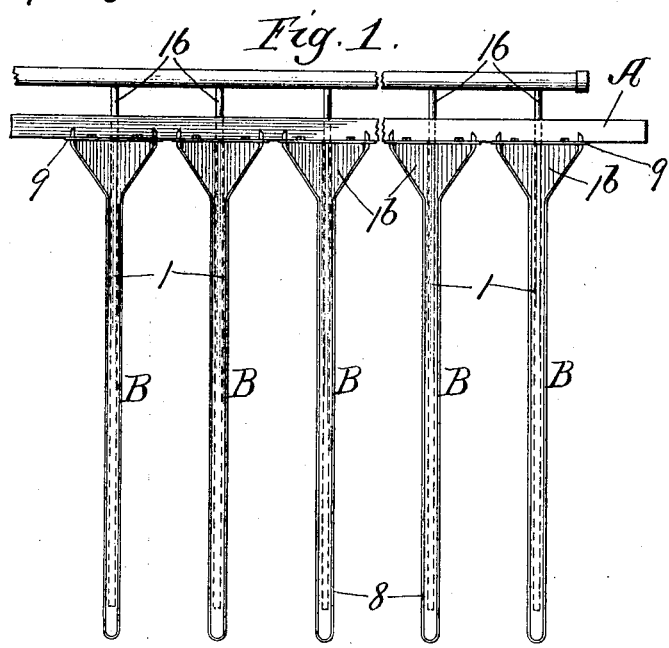
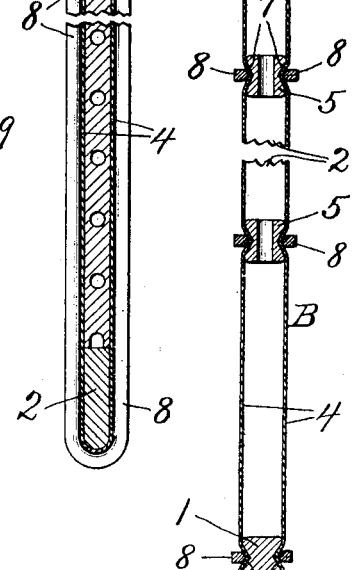
Witnesses
Edward T. Wray.
Fred G. Fischer
Inventor
Oliver P. Ankeny
by Burton & Burton
his Atty's.

No. 764,973. PATENTED JULY 12, 1904.
O. P. ANKENY.
DEVICE FOR SEPARATING SLIMES IN ORE REDUCTION.
APPLICATION FILED MAR. 14, 1904.
NO MODEL. 2 SHEETS—SHEET 2.
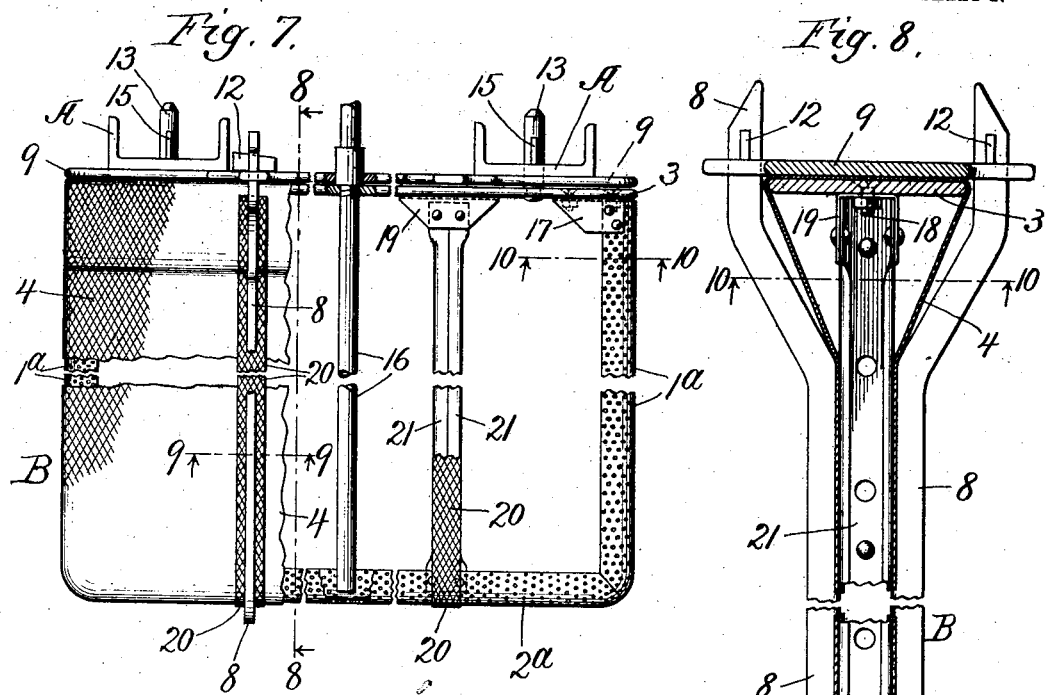
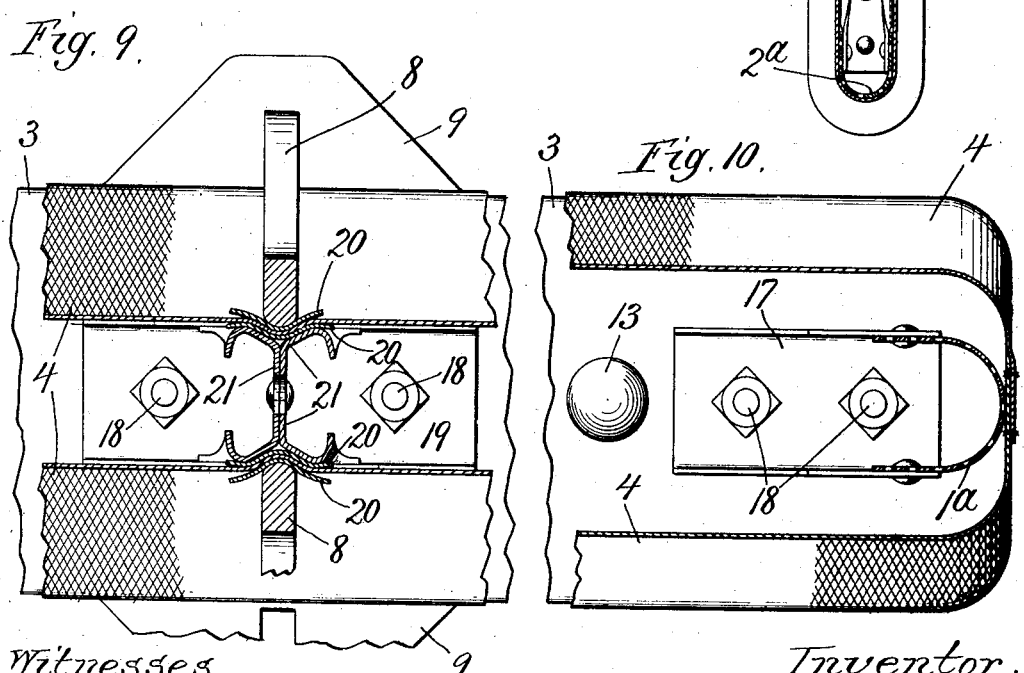
Witnesses
Edward T. Wray
Fred G. Fischer
Inventor.
Oliver P. Ankeny
by Burton & Burton
his Atty's.

No. 764,973.

Patented July 12, 1904.

UNITED STATES PATENT OFFICE.

OLIVER P. ANKENY, OF DEADWOOD, SOUTH DAKOTA.

DEVICE FOR SEPARATING SLIMES IN ORE REDUCTION.

SPECIFICATION forming part of Letters Patent No. 764,973, dated July 12, 1904.

Application filed March 14, 1904. Serial No. 198,076. (No model.)

*To all whom it may concern:*

Be it known that I, OLIVER P. ANKENY, a citizen of the United States, residing at Deadwood, in the county of Lawrence and State of South Dakota, have invented new and useful Improvements in Devices for Separating Slimes in Ore Reduction, of which the following is a specification, reference being had to the accompanying drawings, forming a part thereof.

The purpose of this invention is to provide an improved construction of certain apparatus used for separating slimes by filtering from the liquid in which they are contained and held more or less in suspension while treating the slimes by cyanid or other similar process for separation of the metal values from them.

It consists of the features of construction of the device set out in the claims.

In the drawings, Figure 1 is a side elevation of a portion of an apparatus for the purpose indicated containing my improvements. Fig. 2 is a horizontal transverse section of one of the filtering-cells. Fig. 3 is a vertical transverse section of the same and of the supporting-frame. Fig. 4 is a detail section at the line 4 4 on Fig. 3. Fig. 5 is a detail section in the same plane as Fig. 4, showing a modified form of bolt for securing the cell to the support. Fig. 6 is a detail section through the cell across one of the spacing-bars, showing a modified form of such bar. Fig. 7 is a side elevation of a modified form of cell with the filtering-cloth partly removed and the upper and lower frame broken away at one point and shown in section about the exhaust-pipe. Fig. 8 is a section at the line 8 8 on Fig. 7. Fig. 9 is a section at the line 9 9 on Fig. 7 on a larger scale than the latter figure. Fig. 10 is a section at the line 10 10 on Figs. 7 and 8 on the same scale as Fig. 9.

The class of filtering appliances to which my present improvements are applied is that in which a multiplicity of filtering-cells, each consisting of a peripheral frame about which a canvas inclosing cover is stretched, forming a thin canvas box or cell of large lateral surface, are suspended from a supporting structure by which the entire assemblage of such filtering-cells is depressed edgewise into a tank containing the slime-bearing liquid, the interior of each of the cells being connected with means for producing partial vacuum therein, so as to suck the liquid in through the canvas and discharge it through the connecting-pipes, causing the slimes to be deposited upon the outer surface of the canvas, so that the entire assemblage of cells when sufficiently loaded with the deposit being withdrawn from the tank may be completely evacuated of the water and then freed from the slime deposit by reversing the action of the air connections, so as to inflate the cells, forcing the air outward through the canvas.

My invention consists of an improvement in the means for securing the canvas about the frames to form the cells and in the means for securing the cells to the supporting structure.

In the drawings, A represents a horizontal bar of a frame structure from which a multiplicity of cells is suspended and by which such cells are raised and lowered and otherwise moved for the purpose of introducing the cells into the liquid and removing them therefrom and carrying them to proper position for discharging the slimes deposited thereon. The mechanism for operating this supporting-frame bar constitutes no part of my invention and is not shown.

B B B are the several cells. Each cell comprises a peripheral frame consisting in the form shown in Figs. 1, 2, 3, and 4 of side bars 1 1, a lower edge bar 2, and a top bar 3, suitably framed together to make a rectangular frame about which the filtering canvas 4 is stretched. For convenience and to facilitate the action of the air-exhausting devices the side bars 1 1 at their upper ends have a flaring portion $1^a$, and the upper bar 3 is as wide as the upper end of this flared and widened portion of the side bars, while the lower bar 2 is narrow, as seen in the drawings. In practice the width or thickness of the lower bar and side bars, except as to the widened ends of the latter, may be conveniently made about one inch, and the top bar may be made from four inches to eight inches wide, according to the interval which it is considered desirable to leave between the consecutive cells as they are suspended on the frame-bar A, which is to be determined by experience with the different sorts of slimes operated upon, so as to leave between the consecutive cells when they are suspended room for the accumulation and discharge of slimes. In forming these cells the canvas is preferably folded at the middle point of its length about the lower bar 2 of the frame and brought up on opposite sides, the ends being folded over the opposite edges of the top bar 3 and clamped thereto, as seen in Fig. 3, by the clamping-plate 9, which is secured firmly to the top bar 3 by bolts 10 10. The lateral edges of the canvas are secured to the said bars 1 1, as hereinafter described. For the purpose of keeping the opposite canvas walls of each cell from coming into contact with each other when the partial vacuum is produced in the cell, and thus destroying the cavity into which the water is to be drawn through the canvas, spacing-bars 5 5 5, &c., are extended across the cell from top to bottom at intervals of a few inches, such bars being of the width of the bottom bar 2, which is the same as the width of the side bars 1 1 from the lower end up to the point where they begin to widen to form the flaring portion $1^a$, above described. In order that the canvas may be held in against the spacing-bars when the cells are inflated for the purpose of discharging the deposit from their outer surface, as above described, it is desirable to secure the canvas to the spacing-bars, and such securement to these bars, as well as to the side bars of the frame, for the purpose of completing the inclosure of the cell is desirably made by means such as will not make it necessary to puncture the canvas or to impose the strain of inflation upon a few points only of the canvas, as would be the case if it were secured by tacks or staples. For securing the canvas, therefore, not only to the spacing-bars, but also to the side bars, I form in the edges of said spacing-bars 5 and side bars 1 1 shallow grooves 7 7, and I provide U-shaped clamps 8 8 8 of suitably stiff rods folded at the middle point of their lengths, respectively, the two branches from the fold extending parallel with each other at a distance adapting them to lodge snugly in opposite grooves of the side bars and spacing-bars, with the canvas grasped between for a distance of their length corresponding to the distance from the lower edge of each cell to the point where the flaring portion $1^a$ of the side bars commences and thence diverging at an angle corresponding to the divergence of the opposite edges of said flaring portion to a distance equal to the length of said edges and then turning into parallel direction for extending past the lateral edges of the top bars 3. The ends of the U-shaped clamps 8 8 have slots 11 11 above the clamping-plate 9, adapted to receive tapering keys 12 12, which being driven thereinto serve to draw the clamps tightly up about the cell, forcing them into the grooves and depressing the canvas thereinto, making a tight junction and gripping the canvas throughout the entire length of the clamps, so that the strain of the load of slimes and of inflation is distributed well over the whole surface of the canvas and is endured without tendency to rupture.

In order that the cells may be easily detached from the supporting-frame bar when repairs become necessary, provision is made for securing them to said bar by means of bolts 13 13, set through the top bar 3 and the clamping-plate 9 from the inner side, so that they are stopped by the heads against said inner side. Ordinary round bolts may be employed, being driven through the holes provided for them, such holes being originally bored of such diameter that when the bolts are driven through they substantially close the holes, and thus pass air-tight through the head of the cell, (or such bolts may be threaded and screwed through in the same manner to form a tight connection.) The upper ends of the bolts above the plate 9 pass through holes in the frame-bar and receive above said bar tapering keys 15, set through slots 14 in the bolts and adapted to be driven in tightly to draw the cells up against and bind them tightly to the frame-bar.

In Fig. 6 I have shown a modified construction of the spacing-bars, such as may be conveniently made of metal. In this form they are in the shape of I-beams whose stems or webs are thin and cause only slight reduction in the capacity of the cell, while the cross-flanges are formed diverging slightly from each other where they diverge from the web, so as to form the recess or channel into which the clamp presses the canvas for binding it in place. Whether the spacing-bars be made of wood in the form shown in Figs. 1 and 2 or of metal in the form shown in Fig. 6 the outer edges should be curved, as in both said figures, so that the canvas when collapsed by the suction may meet rounded surfaces and not sharp corners as it is folded down over the edges of the spacing-bars. 16 16 represent the pipes leading to the pump (not shown) for first sucking the water in through the canvas to cause the exterior deposit of slimes and afterward forcing it out through the same to dislodge the slimes, as described.

In Figs. 6, 7, 8, and 9 I have shown a modified and in some respects preferred form of my invention, adapted to be constructed of metal instead of wood for the framework. In this form the lateral and bottom bars of the frame $1^a$ $1^a$ $2^a$ are made of U-shaped channel-bar rounded at the corners of the frame, as seen in Fig. 7. Such channel-bar is preferably made of perforated sheet metal, so that practically the entire surface of the canvas wrapped about it becomes serviceable as a filtering-surface, and the exhaust-pipe 16 terminates within the cavity of the lower channel-bar 2ª. In this construction the side bars 1ª 1ª are not widened at the upper end, as in the form shown in Figs. 1 and 3, but extend of uniform width to the top bar 3, to which they are made fast by means of a downwardly-open channel-clip 17, having its flanges riveted to the sides of the channel-bars, as will be clearly understood from Figs. 7 and 8, and having its intermediate web secured to the under side of the bar 3 by bolts 18 with countersunk heads laid in flush with the upper side of said bar. The filtering-canvas 4 is in this construction sewed up at the sides to form a bag which is passed over the frame from the bottom, being made to fit it snugly, the upper margin being lapped over the sides and ends of the bar 3, so as to be clamped between that bar and the clamping-plate 9. This construction dispenses with the flaring and grooving of the side bars and with the use of the clamps 8 on such side bars; but such clamps are used upon the spacing-bars, as in the other construction. The spacing-bars, however, for the metal frame structure are preferably made, as seen in Fig. 9, of two pieces of sheet metal 18 18, rolled in channel-form, with flat webs and diverging flanges inturned at their edges, so that when two such channels are riveted together back to back, as seen in Fig. 9, their diverging flanges at each edge form the desired grooves, into which the canvas is sunk and clamped by the U-shaped clamps 8, which are of the same form as already described in the other figures. These spacing-bars are secured to the top bar 3 by the channel-clips 19, whose flanges are riveted to the flanges of the spacing-bars, the web being secured to the top bar 3 in the same manner as in the case of the channel-clips 18 above described.

In order to prevent the filtering-web from becoming ruined by rusting in contact with the metal—the frame and the spacing-bars—the fabric strips 20 20 are interposed between the filtering-web and the spacing-bars on the inside and the clamps on the outside. I have not shown similar protection at other points where the web touches the metal; but the use of this expedient is obviously not limited to the spacing-bars and clamps. It would be to some extent objectionable to interpose a fabric strip between the perforated channel-bars 1ª 1ª and 2ª and the filtering-web because of the obstruction it would offer to the filtering; but in some cases this objection would be of small moment. In general, however, the channel-bar frame, if made of iron, will be galvanized or tinned to diminish the danger of rusting the filtering-web.

I claim—

1. A filtering-cell comprising a peripheral frame; a filtering-web covering the opposite sides of said frame and secured to the bars thereof; bars extending across said frame between the webs for spacing the latter apart, and clamping-bars outside the filtering-web binding the latter to the edges of the spacing-bars.

2. A filtering-cell comprising a peripheral frame; filtering-webs at opposite sides thereof secured to the frame for inclosing the cell; bars extending across the frame between the webs for spacing the latter apart, said bars having their edges grooved, and U-shaped clamps applied outside the web pressing the canvas into the grooves of the spacing-bars, and means for preventing the spreading of said U-shaped clamps.

3. A filtering-cell comprising a peripheral frame; a filtering-web folded about one side bar of the frame covering the two opposite sides thereof and lapped over the edges of the opposite side bar for inclosing the cell; a plate outside said opposite side bar; bolts which bind it to said side bar with the edges of the canvas grasped between said plate and bar for securing them to the latter, said frame having other bars interposed between the opposite sides of the filtering-webs having their edges grooved and covered by the web; U-shaped clamps striding said grooved bars engaging the grooves and sinking the web thereinto, the opposite ends of said U-shaped clamps being extended through said plate, and means above the latter for drawing the clamps tightly into the grooves.

4. A filtering-cell comprising a peripheral frame; a filtering-web folded about one side bar of the frame covering the two opposite sides thereof and lapped over the edges of the opposite side bar for inclosing the cell; a plate outside said opposite side bar; bolts which bind it to said side bar with the edges of the canvas grasped between said plate and bar for securing them to the latter, the frame having other bars interposed between the opposite sides of the filtering-web having their edges grooved and covered by the web; U-shaped clamps striding said grooved bars engaging the grooves and sinking the web thereinto, the opposite ends of said clamps extending through said plate and provided with slots above the latter and tapering keys adapted to be driven in said slots to force the clamps into the grooves.

5. A filtering apparatus comprising a multiplicity of filtering-cells, each consisting of a peripheral frame; a filtering-web covering and inclosing the frame; a supporting-bar from which said cells are suspended, each cell having a stem rigid with its top bar, protruding thereabove and extending through a hole in the supporting-bar, and means adapted to be applied to the same above the supporting-bar for binding the cell to the bar.

6. A filtering apparatus comprising a multiplicity of filtering-cells, each consisting of a peripheral frame; a filtering-web covering and inclosing the frame; a supporting-bar from which said cells are suspended; a stem protruding from the top bar of each cell and penetrating the supporting-bar and having above the latter a longitudinal slot, and a tapered key adapted to be driven in such slot to bind the cell up against the lower side of the bar.

7. In a filtering-cell, in combination with a filtering-web forming two opposite sides of the cell; bars which space apart the opposite side webs, and clamps outside the filtering-web binding them onto the spacing-bars.

8. A filtering-cell comprising a metal frame and a filtering-web applied outside the same, the lateral and bottom bars of such frame being made of perforated metal channel-bar.

9. In a filtering-cell, spacing-bars for the purpose indicated, comprising each two sheet-metal channel-bars with diverging flanges secured together back to back to form grooves at their opposite edges between the corresponding diverging flanges.

10. A filtering-cell comprising a peripheral frame whose lateral and bottom bars consist of U-shaped channel with the channels opening inward; a top bar secured at the upper ends of the lateral bars, and a filtering element consisting of a bag inclosing the frame and having the margins at its mouth clamped onto the top bar.

11. A filtering-cell comprising a peripheral frame and a filtering-web encompassing and inclosing the same; metal spacing-bars extending from top to bottom of the frame at intervals in the width of the latter for spacing apart the filtering-web at the opposite sides, and metal clamps applied outside of said spacing-bars to bind the webs thereto, in combination with fabric strips interposed between the web and the metal spacing-bars and clamps respectively.

12. A filtering-cell comprising a metal framework; a filtering-web stretched outside such framework; means for clamping it to the framework, and fabric strips interposed between the filtering-web and the metal framework and clamping devices respectively.

In testimony whereof I have hereunto set my hand, in the presence of two witnesses, at Deadwood, South Dakota, this 5th day of March, 1904.

OLIVER P. ANKENY.

In presence of—
JOHN R. WILSON,
GEORGE A. GORDER.